United States Patent
Frenzel et al.

(10) Patent No.: US 9,749,008 B2
(45) Date of Patent: Aug. 29, 2017

(54) LOW POWER MODE FOR VECTORED DATA TRANSMISSION

(75) Inventors: Rudi Frenzel, Munich (DE); Axel Clausen, Munich (DE); Heinrich Schenk, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 104 days.

(21) Appl. No.: 13/149,783

(22) Filed: May 31, 2011

(65) Prior Publication Data
US 2012/0026926 A1 Feb. 2, 2012

Related U.S. Application Data

(60) Provisional application No. 61/350,108, filed on Jun. 1, 2010.

(30) Foreign Application Priority Data

May 31, 2010 (EP) .................................. 10005639

(51) Int. Cl.
*H04B 3/32* (2006.01)
*H04W 52/02* (2009.01)
*H04L 5/00* (2006.01)
*H04M 11/06* (2006.01)

(52) U.S. Cl.
CPC ............ *H04B 3/32* (2013.01); *H04L 5/0007* (2013.01); *H04L 5/0046* (2013.01); *H04M 11/062* (2013.01); *Y02B 60/36* (2013.01)

(58) Field of Classification Search
CPC .. H04W 88/06; H04W 52/0235; H04L 12/66; H04L 43/16; H04B 1/0475; H04B 1/1615; H04B 5/0062
USPC ...................................... 370/311; 379/406.06
See application file for complete search history.

(56) References Cited

U.S. PATENT DOCUMENTS

| | | | | |
|---|---|---|---|---|
| 6,144,695 A | * | 11/2000 | Helms et al. ................. | 375/222 |
| 2004/0184520 A1 | * | 9/2004 | Palm ............................ | 375/222 |
| 2006/0274893 A1 | * | 12/2006 | Cioffi et al. ............. | 379/399.01 |
| 2008/0176548 A1 | * | 7/2008 | Liang ............................ | 455/419 |
| 2009/0135752 A1 | * | 5/2009 | Su et al. ....................... | 370/311 |
| 2009/0245081 A1 | * | 10/2009 | Ashikhmin ............. | H04M 3/18 370/201 |
| 2009/0252073 A1 | * | 10/2009 | Kim .................. | H04W 52/0206 370/311 |
| 2010/0046738 A1 | * | 2/2010 | Schelstraete et al. ... | 379/406.01 |
| 2010/0232486 A1 | * | 9/2010 | Starr et al. .................... | 375/222 |
| 2011/0103574 A1 | * | 5/2011 | Anschutz et al. ........ | 379/406.06 |

* cited by examiner

*Primary Examiner* — Andrew Chriss
*Assistant Examiner* — Romani Ohri
(74) *Attorney, Agent, or Firm* — Eschweiler & Potashnik, LLC

(57) ABSTRACT

Vectored communication devices and methods are provided for communication via a plurality of communication connections. Communication on at least some of the communication connections is switchable between a low power mode and a regular mode.

12 Claims, 6 Drawing Sheets

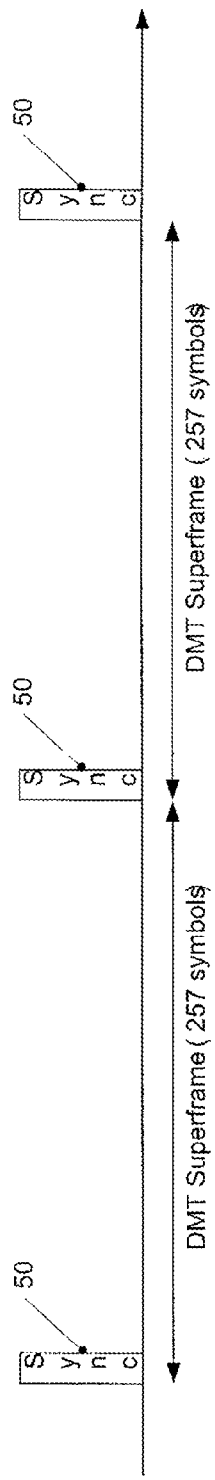
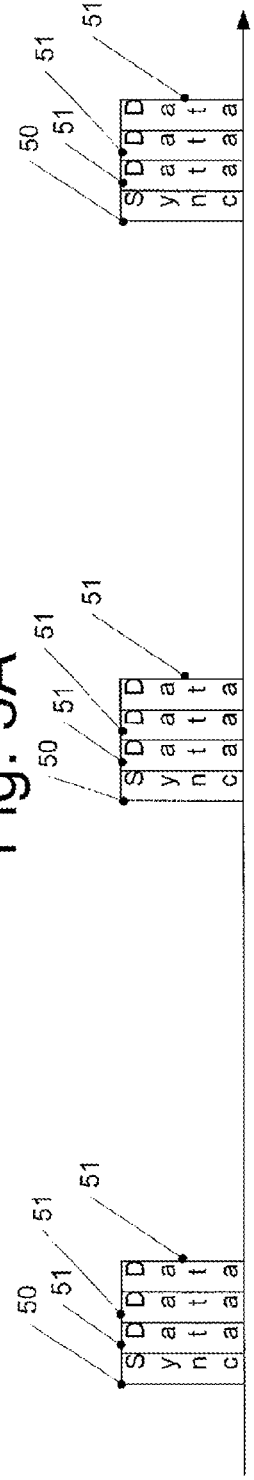
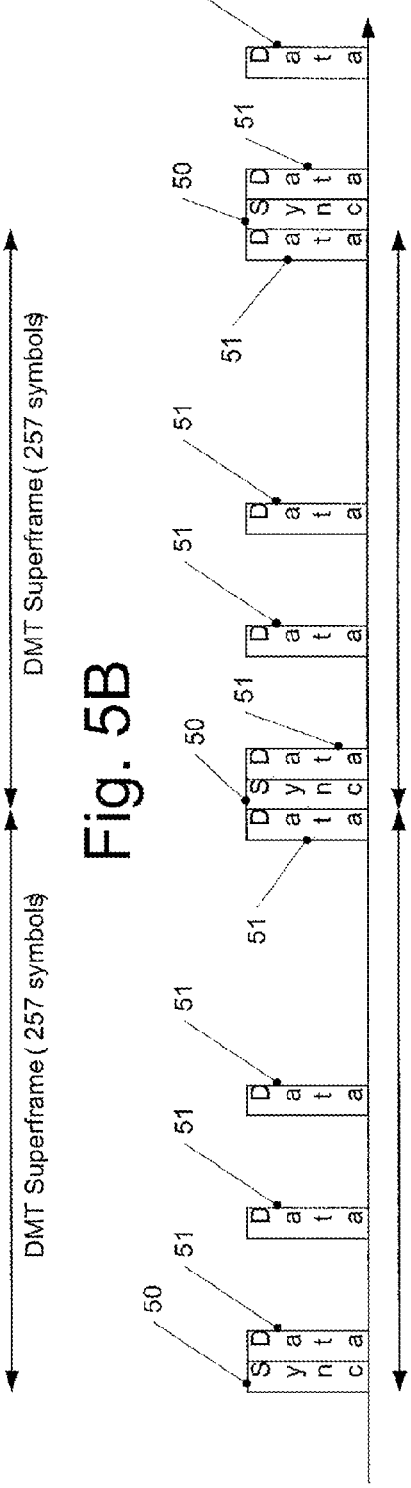
Fig. 5A
Fig. 5B
Fig. 5C ized as a device, a system, a device comprising a plurality of devices, a method or a computer program. Therefore, while some embodiments will be described in the following as devices, other embodiments may for example take the form of computer programs which are configured to perform the actions described with respect to the device embodiments. # LOW POWER MODE FOR VECTORED DATA TRANSMISSION

RELATED APPLICATIONS

This application claims benefit of European Patent Application 10005639.9, which was filed on May 31, 2010, and U.S. Provisional Application 61/350,108, which was filed on Jun. 1, 2010. The entire contents of the European and Provisional Applications are hereby incorporated herein by reference.

BACKGROUND

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems like VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication connections which are processed jointly are sometimes referred to as vectored group.

For VDSL2, vectoring has been standardised in ITU recommendation G.993.5.

Equipment used for such vectored data transmission, in particular when a high number of communication connections like communication lines is involved, consumes considerable power. This power consumption of such equipment like DSL equipment is becoming more and more a concern for operators, customers and also for government agencies. In addition, communication lines of DSL systems are increasingly used also to provide telephone services and to provide television services, and such lines are then nearly always turned on, which increases the power consumption.

SUMMARY

In one example, a communication device may include communication circuitry configured to communicate via a plurality of communication connections and crosstalk reduction circuitry to compensate crosstalk on the plurality of communication connections by vectoring. The communication circuitry for at least some of the communication connections may be configured to communicate, switchably individually for each of the at least some of the communication connections, in a regular mode or in a low power mode with less power consumption than in the regular mode.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 5A to 5C illustrate low power modes according to various embodiments.

DETAILED DESCRIPTION OF THE INVENTION

Figure 1:
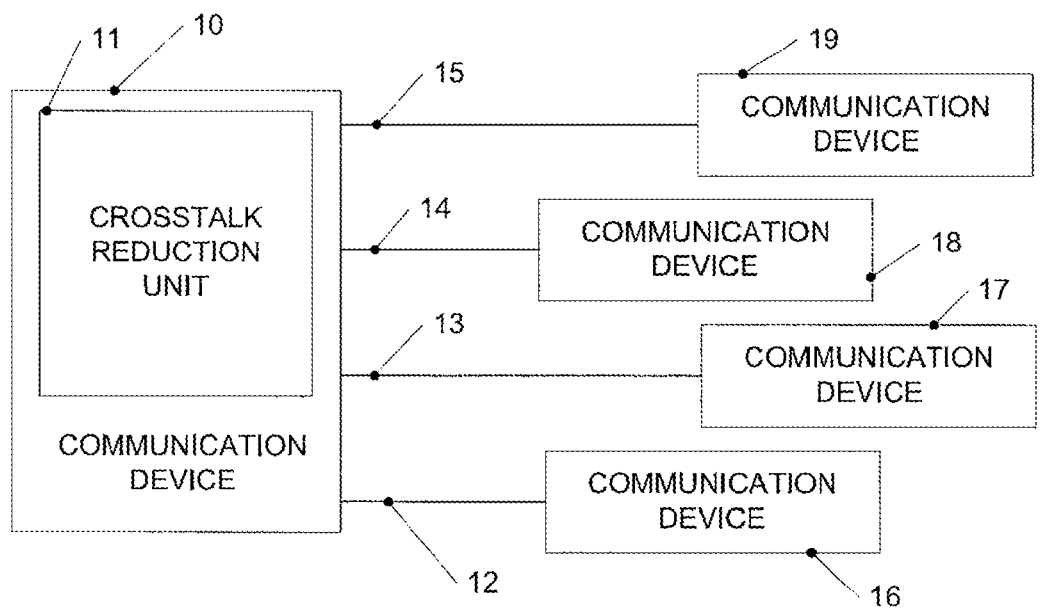
FIG. 1 shows a block diagram of a communication system according to an embodiment.

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings. It is also to be understood that in the following description of embodiments any direct connection or coupling between functional blocks, devices, components, circuit elements or other physical or functional units shown in the drawings or described herein could also be implemented by an indirect connection or coupling, i.e., a connection or coupling with one or more additional intervening elements.

Furthermore, it should be appreciated that functional blocks or units shown in the drawings may be implemented as separate circuits in some embodiments, but may also be fully or partially implemented in a common circuit in other embodiments. In other words, the provision of a plurality of functional blocks in the drawings is merely intended to facilitate the understanding of the respective embodiment, but is not to be construed as indicating that the functional blocks have to be implemented separately from each other. It is further to be understood that any connection which is described as being wire-based in the following specification may also be implemented as a wireless connection unless noted to the contrary. In general, the term "communication connection" is intended to refer both to wire-based connections and to wireless connections.

The features of the various embodiments described herein may be combined with each other unless specifically noted otherwise. On the other hand, describing an embodiment with a plurality of features is not to be construed as indicating that all those features are necessary for practising the present invention, as other embodiments may comprise less features, alternative features and/or additional features.

In a first aspect, an embodiment encompasses a communication device, comprising: communication circuitry configured to communicate via a plurality of communication connections, and crosstalk reduction circuitry to compensate crosstalk on the plurality of communication connections by vectoring, wherein the communication circuitry for at least some of the communication connections is configured to communicate, switchably individually for each of the at least some of the communication connections, in a regular mode or in a low power mode with less power consumption than in the regular mode.

In an embodiment of the communication device according to the first aspect, the communication circuitry is configured to communicate an entering of the low power mode via the respective communication connection. In an embodiment, the communication of entering the low power mode comprises the transmission of a marked synchronisation symbol via the respective communication connection. In a further embodiment, the communication of entering low power mode comprises transmitting a predetermined data symbol following a synchronisation symbol via the respective communication connection.

In an embodiment of the communication device according to the first aspect, communication via the plurality of communication connections comprises a transmission of frames, each frame comprising a synchronisation symbol followed by data symbols, wherein in the low power mode at least some of the data symbols are set to zero nominal transmit power.

In an embodiment of the communication device according to the first aspect, communication via the plurality of communication connections is a multicarrier communication. In an embodiment the low power mode comprises a use of a different bit loading table describing bit loading for the carriers of the multicarrier communication and/or a different gain table defining gains for the plurality of carriers than in the regular mode. In a further embodiment, in the low power mode only some carriers of the multicarrier communication are used.

In an embodiment of the communication device according to the first aspect, communication via the plurality of communication connections comprises a modulation using a plurality of different constellations, wherein in the low power mode a number of constellations is reduced.

In an embodiment of the communication device according to the first aspect, the communication device is configured to perform DSL communication via the plurality of communication connections.

In a second aspect, an embodiment encompasses a method, including transmitting data via a plurality of communication connections, reducing crosstalk by joint processing of data transmitted via the plurality of communication connections, and switching between a regular mode and a low power mode for at least some of the communication connections.

In an embodiment of the method according to the second aspect of the invention, the switching is performed depending on an amount of data to be transferred via a respective communication connection.

An embodiment of the method according to the second aspect comprises communicating the switching via the respective communication connection. In an embodiment, communicating the switching comprises transmitting a marked synchronisation symbol. In an embodiment, communicating the switching comprises transmitting a predetermined data symbol following a synchronisation symbol.

An embodiment of the method according to the second aspect, the data transmission via the plurality of communication connections is a multicarrier transmission. In an embodiment, switching to low power mode comprises omitting some of the plurality of carriers on a communication connection switched to low power mode. In an embodiment, the low power mode comprises a use of a different bit loading table describing bit loading for the carriers of the multicarrier communication and/or a different gain table defining gains for the plurality of carriers than in the regular mode.

In an embodiment of the method according to the second aspect, transmitting data via the plurality of communication connections comprises transmitting of frames, each frame comprising a synchronisation symbol followed by data symbols, wherein in the low power mode at least some of the data symbols are set to zero nominal transmit power.

In an embodiment of the method according to the second aspect of the invention, transmitting data via the plurality of communication connections comprises a modulation using a plurality of different constellations, wherein in the low power mode a number of constellations is reduced.

In some embodiments, vectored communication system and vectored communication devices which may be set to a low power mode are provided. Through vectoring, far end crosstalk (FEXT) may be reduced or cancelled. In the low power mode, on certain communication channels for example less data may be sent, a transmit power may be reduced and/or some carriers used for data transmission may be unused. Through the vectoring, in some embodiments a switching between the low power mode and a regular mode of operation is possible without significant adverse results on crosstalk between communication connections involved. In other words, in some embodiments the implementation of a low power mode without vectoring would not be possible, would adversely affect data transmission on other communication connections not set to low power mode, or would require additional effort, as switching one communication connection between low power mode and regular mode via crosstalk would change the conditions on other communication connections. This may adversely affect the communication on these other communication connections and could for example require a re-initialization of these other communication connections. On the other hand, since through vectoring the influence of crosstalk between the communication connections may be significantly reduced or even eliminated, entering and leaving the low power mode in one or more of the communication connections in some embodiments has little or no influence on the communication on other communication connections of a vectored group, which makes implementation of low power modes in such embodiments more feasible.

In FIG. 1, a communication system according to an embodiment of the present invention is schematically shown.

In the communication system of FIG. 1, a communication device 10 communicates with communication devices 16, 17, 18 and 19 via respective communication connections 12, 13, 14 and 15. While in FIG. 1 four communication devices 16, 17, 18 and 19 are shown, in other embodiments any other suitable number of communication devices may be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of the communication connections 12, 13, 14 and 15 may be unidirectional communication connections. In another embodiment, all or some of the communication devices 16, 17, 18, 19 may be co-located.

In the embodiment of FIG. 1, couplings between the communication connections 12 to 15 may cause crosstalk, for example if some or all of the communication connections are wirelines running close to each other. Through at least partial joint processing of the signal transmitted from communication device 10 to communication devices 16, 17, 18 and 19 and through at least partial joint processing of signals received from communication device 16, 17, 18 and 19 at communication device 10 in a crosstalk reduction unit 11 thereof, the influence of such crosstalk may be reduced. As already mentioned, the joint processing for crosstalk reduction is also referred to as vectoring, and the communication connections which are subjected to such crosstalk reduction are also referred to as vectored group.

In the following, the transmission direction from communication device 10, which for example may be located in a central office (CO), to communication devices 16, 17, 18 and 19, which may for example be located in customer premises (CPE), will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may, for example, be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections of the vectored group. However, also other calculation methods, for example non-linear calculations, are also possible.

In an embodiment, some or all of the communication connections 12, 13, 14 and 15 may individually be switched between a regular mode of operation and a low power mode. The low power mode may be entered when communication device 10 or the respective communication device 16, 17, 18 or 19 recognises that little or no data is sent via the respective communication connection. For example, the low power mode may be entered when no data has been sent for a predetermined period of time, and/or when an amount of data to be sent or received is below a predetermined threshold for a predetermined period of time. When later data again is to be transmitted or data exceeding the threshold is to be transmitted, the respective communication connection switches to regular mode. The switching between regular mode and low power mode may be performed based on corresponding requests exchanged between communication device 10 and the respective communication device 16, 17, 18 or 19. Examples for such signals exchanged and for implementation of low power modes will be explained further below.

Communication systems like the ones shown in FIG. 1 which employ vectoring and switching between low power mode and regular mode may, for example, be implemented as DSL communication systems like VDSL or VDSL2 communication systems. Examples for such implementations according to embodiments will now be explained with reference to FIGS. 2 and 3.

Figure 2:
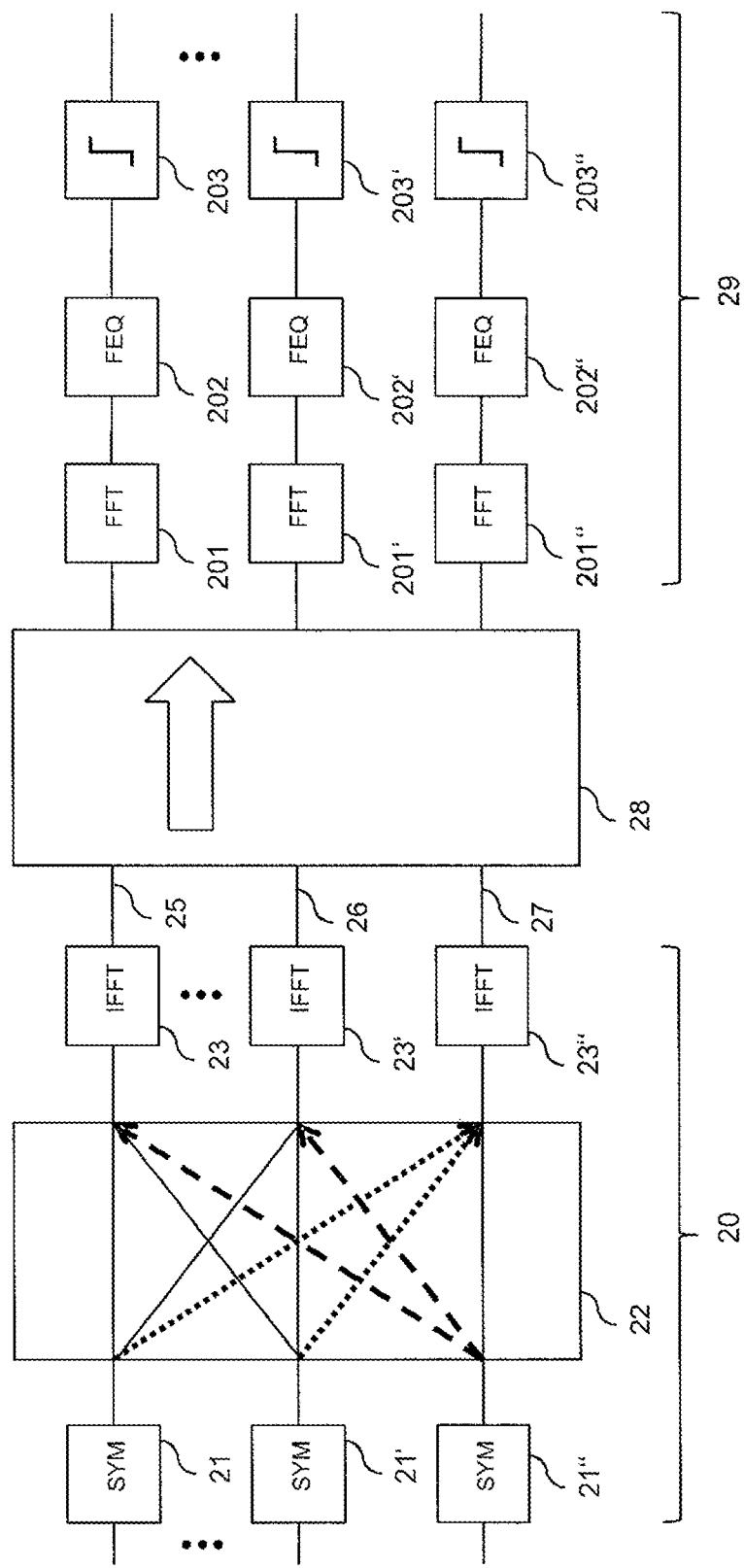
FIG. 2 shows a block diagram of a communication system according to an embodiment operating in a downstream direction.

In FIG. 2, a DSL communication system according to an embodiment of the present invention is shown transmitting data in the downstream direction. In other words, in the system shown in FIG. 2 data is transmitted from a central office 20 via a plurality of communication lines 25, 26 and 27 to a plurality of receivers in customer premises generally labelled 29. In the system of FIG. 2, the communication lines are joined in a so-called cable binder 28. Communication lines in a cable binder are usually located comparatively close to each other and are therefore prone to crosstalk. In the system shown in FIG. 2, Communication lines 25, 26 and 27 are part of a vectored group of communication lines. It should be noted that in other embodiments so-called partial vectoring may be performed, where only some of the communication lines 25, 26, 27 are part of the vectored groups. It should also be noted that the provision of three communication lines 25, 26, 27 in FIG. 2 serves only as an example, and any number of communication lines may be present.

In the system of FIG. 2, symbol mappers denoted with reference numerals 21, 21' and 21" map data, for example payload or training or pilot data, onto carrier constellations which are to be transmitted via communication lines 25, 26 and 27, respectively. A crosstalk precompensator 22 modifies these symbol mappings in order to precompensate crosstalk occurring during the transmission. The such modified carrier mappings are modulated onto a plurality of carriers for each communication lines, the carriers having different frequencies and being an example for a plurality of communication channels on a single communication connection, and are then transferred into signals in the time domain by inverse fast Fourier transformers 23, 23' and 23", respectively. This type of modulation, also referred to as discrete multi tone modulation (DMT), is commonly used in DSL systems like VDSL or VDSL2 systems. The such generated signals are then transmitted via the communication lines 25, 26 and 27 to the customer premises 29. In the customer premises, the received signals are converted into the frequency domain by fast Fourier transformers 201, 201' and 201", respectively, and equalized by frequency equalizers 202, 202' and 202", respectively, before slicers 203, 203' and 203", respectively, output received constellations which, in case of an error-free transmission, correspond to input constellations generated in symbol mappers 21, 21' and 21" which were originally intended for transmission. It is to be understood that for clarity's sake only some elements of the communication devices involved are shown, and further elements like amplifiers, sampling units, analog-to-digital or digital-to-analog converters and the like may be present.

If either central office 20 or data communication equipment in customer premises associated with a particular communication line 25, 26 or 27 recognises that little or no data is sent over a particular communication line, it may request or inform the respective other side (central office 20 or customer premises 29) that the communication line will be set into a low power mode. For example, if by analysing the constellations output from slicer 203, it is detected in customer premises 29 that little or no data is received, a corresponding request to set the communication line to low power mode may be sent to central office 20, or if central office 20 detects that little or no data is sent via communication line 25, it may inform the corresponding customer premises equipment that the communication line 25 will be set to a low power mode. Examples for such signalling and for low power modes will be explained further below.

Next, with reference to FIG. 3, a DSL communication system operating in the upstream direction will be explained. In the system shown in FIG. 3, data is sent from customer premises equipment 39 via a plurality of communication lines 35, 36, 37 to a central office 30. It should be noted that in a bidirectional communication system, communication line 35, 36 and 37 may be the same as communication lines 25, 26 and 27 in FIG. 2, and for example different frequency ranges may be used for upstream and downstream transmission.

Figure 3:
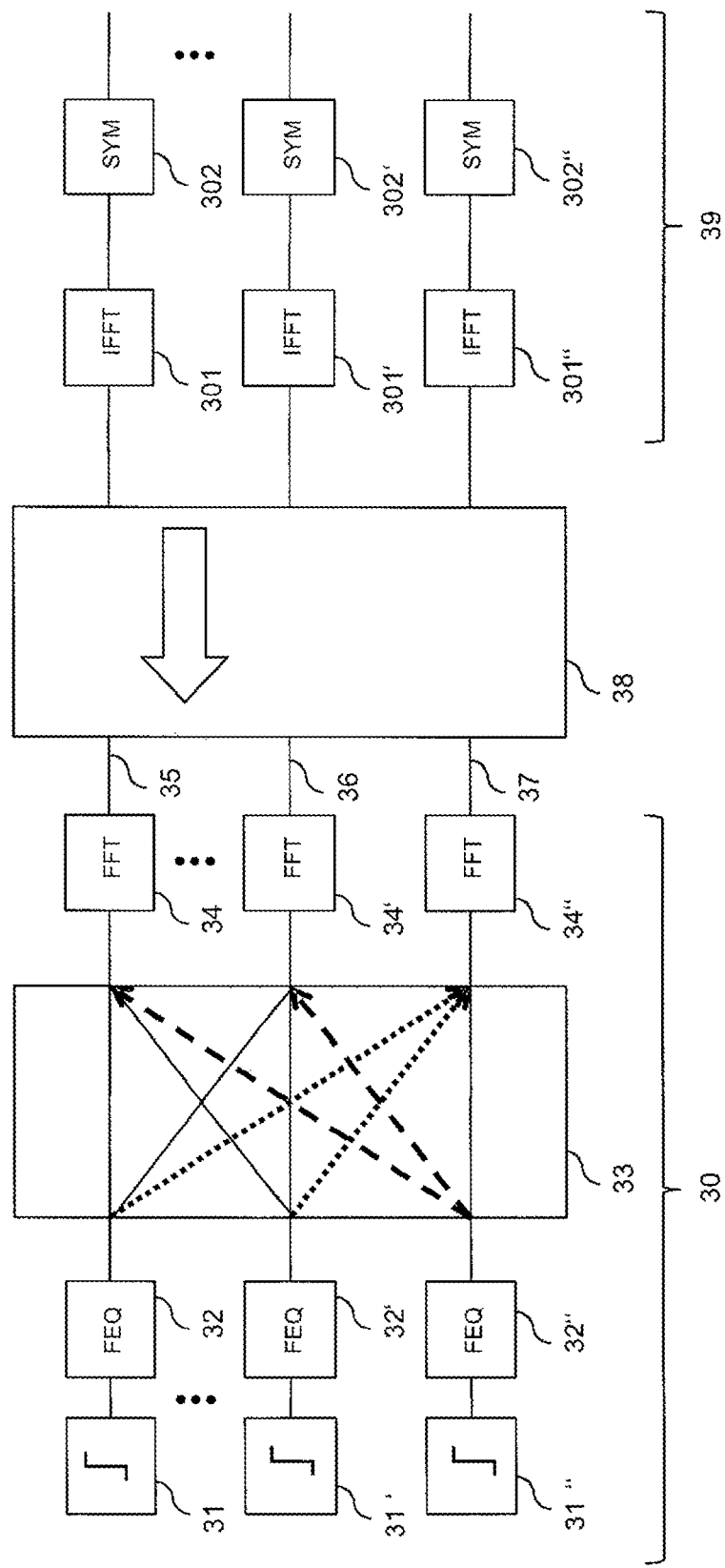
FIG. 3 shows a block diagram of a communication system according to an embodiment operating in an upstream direction.

Again, while three communication lines 35, 36 and 37 are shown in FIG. 3, any number of communication lines may be present.

In FIG. 3, in each customer premises 39 equipment data, for example payload or training or pilot data, is mapped onto carrier constellations by a respective symbol mapper 302, 302' and 302". The carrier mappings are then modulated onto a plurality of carriers for each communication line and then transferred into signals in the time domain by inverse fast Fourier transformers 301, 301' and 301", respectively. The signals are then transmitted to central office 30 via communication lines 35, 36 and 37, which may be located in a cable binder 38. In central office 30, the received signals are converted to the frequency domain by fast Fourier transformers 34, 34' and 34". A crosstalk canceller 33 then jointly processes the received signals to cancel or reduce crosstalk. The thus modified signals are equalized by frequency equalizers 32, 32' and 32", and then slicers 31, 31' and 31" generate received signal constellations which, again, in case of error-free transmission correspond to the signal constellations mapped by symbol mappers 302, 302' and 302".

When little or no data is sent on one or more of communication lines 35, 36, 37, the respective communication line may be switched to a low power mode, similar to what was already discussed for the downstream direction with reference to the FIG. 2. The signalling may be similar to the signalling already discussed with reference to FIG. 2. It should be noted that the switching to low power mode in upstream direction and downstream direction may be performed jointly in some embodiments, but may also be performed independently from each other in other embodiments. For example, when data is transmitted only in one of the directions, the other direction may be set to a low power mode.

It should be noted that also in the embodiment of FIG. 3, additional components like amplifiers, digital-to-analog and analog-to-digital converters or filters may be present which are not shown in the drawings.

In the embodiment of FIGS. 2 and 3, the central office equipment, i.e. the elements on the central office side, for all communication lines may be co-located to enable the joint processing in crosstalk precompensator 22 and crosstalk cancellers 33, respectively, while the elements in the customer premises for different communication lines need not be co-located and may for example be located at different customers.

The various elements shown in FIGS. 2 and 3 are examples for communication circuitry used for communicating via the respective communication connections, in this case communication lines.

Next, with reference to FIGS. 4 to 8, various possibilities for implementing low power modes according to embodiments will be described in detail.

Figure 4:
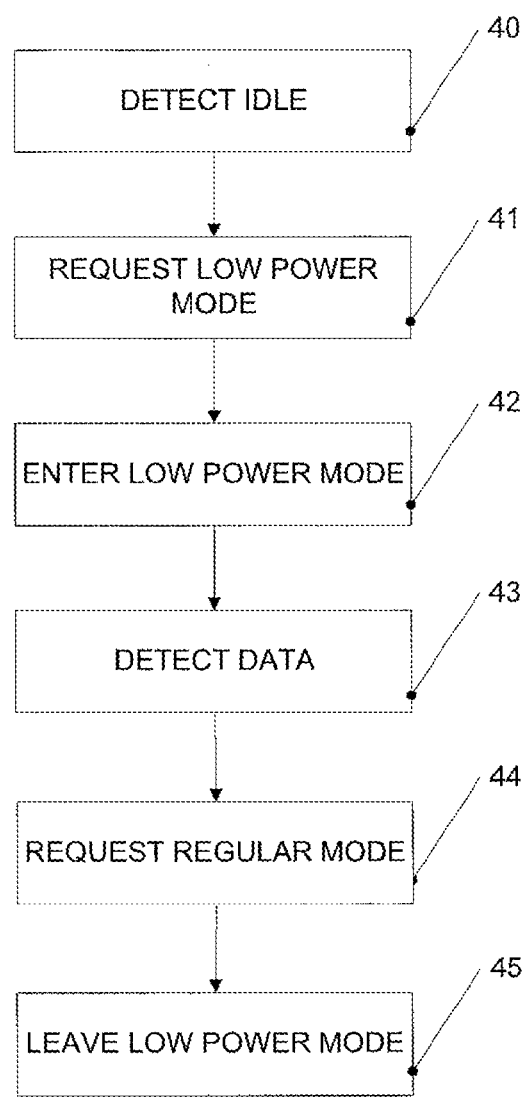
FIG. 4 shows a flow diagram illustrating a method according to an embodiment.

In FIG. 4, a method of an embodiment is schematically shown which illustrates how a low power mode may be entered and left again. While the method is illustrated as a series of actions or steps, it is to be noted that the steps do not necessarily have to be performed in the order described.

In FIG. 4, at 40 it is detected that a communication connection is idle, i.e. no data is sent. In another embodiment, it is detected that the data throughput is below a predetermined threshold. This detection may be performed at a receiver or a transmitter site, i.e. a transmitter may detect that it has little or no data to send, or the receiver may detect that it receives little or no data. At 41, the entity which detected that no or little data is sent, i.e. receiver or transmitter, sends a request for low power mode to the respective other entity, i.e. transmitter or receiver. The request may specify when the power mode is to be entered based on a synchronisation between the entity, or the request may constitute the start of the low power mode such that immediately following the request the low power mode is entered.

At 42, correspondingly, the low power mode is entered.

At 43, one of the entities, usually the transmitter, detects that, again a significant amount of data, for example a non-zero amount or an amount exceeding the threshold mentioned above, is detected. At 44, a request is transmitted to again enter the regular mode. Correspondingly, following the request at 45 the low power mode is left, and communication is resumed in the regular mode to transmit data.

For example in case of DSL systems, the request for low power mode and/or the request for regular mode may be made by modifying synchronisation symbols in a predetermined manner. In the low power mode, in some embodiments only synchronisation symbols or synchronisation symbols and some data symbols may be sent. These possibilities will be further explained with reference to FIGS. 5A to 5C.

For example in VDSL2 systems, symbols are grouped to so-called superframes, each superframe comprising a synchronisation symbol followed by 256 data symbols. The synchronisation symbol comprises predetermined constellations for each carrier used. In other types of communication, other frame structures may be used.

In FIG. 5A, a first possibility for a low power mode is shown. In this case, no data is transmitted, and through regularly sending synchronisation symbols 50 synchronisation is maintained. In other words, at the place of the data symbols zero nominal transmit power is generated, which in some embodiments may be achieved by modulating zeroes on the data symbols. "Zero nominal transmit power" indicates that while no intentional transmit power is sent, due to parasitic effects, noise and the like in some cases some transmit power may be present. As only synchronisation symbols 50 and no data is sent, the transmitted power is reduced, in the example shown to approximately 1/257 of the power needed when transmitting all symbols of each superframe. In an embodiment, the first synchronisation symbol 50 or each synchronisation symbol 50 during the low power mode is marked, for example by inverting constellations on a number of predetermined carriers, to announce the low power mode to the receiver. This is an example for a signalling or request of low power mode from transmitter to receiver. To leave the power mode, in an embodiment where all synchronisation symbols are marked, this marking may simply be stopped, or a synchronisation symbol with a different marking, for example with constellations on different carriers inverted, may be used to request or announce regular transmission.

With the low power mode of FIG. 5A, no data is transmitted. In other embodiments, in a low power mode less data is transmitted than during regular mode. Two such possibilities are shown in FIGS. 5B and 5C, wherein in both cases only some of the possible 256 data symbols of each DMT superframe are transmitted or, in other words, the remaining data symbols are set to zero nominal transmit power.

In FIG. 5B, a predetermined number of data symbols, in the example of FIG. 5B three data symbols, immediately following each synchronisation symbol 50 are transmitted. To request low power mode and to leave low power mode, marked synchronisation symbols as explained above may be used. Additionally or alternatively one or more of data symbols 51, for example data symbol 51 immediately following each synchronisation symbol 50, may be marked or may contain a predetermined value to indicate entering or leaving the low power mode. In the low power mode depicted in FIG. 5B, some data may be transmitted in data symbols 51. It should be noted that also a number other than three data symbols is possible in each DMT superframe. In some embodiments, the number may be chosen to be variable based on the amount of data to be transmitted, and the number of data symbols in each superframe may, for example, be communicated in the first data symbol of each superframe.

Similar to FIG. 5B, also in the example of FIG. 5C, only some data symbols of each superframe are transmitted. However, in FIG. 5C, the data symbols 51 are distributed over the superframe and are not limited to data symbols 51 immediately following each synchronisation symbol 50 as in FIG. 5B. The signalisation of the low power mode via inverted synchronisation symbols or data symbols following the synchronisation symbols which has been described for the low power modes of FIGS. 5A and 5B is also applicable to the low power mode of FIG. 5C. Also in FIG. 5C, the number of data symbols may vary, and for example in a first data symbol 51 immediately following each synchronisation symbol the number and possibly also the location of the data symbols may be encoded.

While the low power modes of FIGS. 5A to 5C have been explained with reference to a DMT superframe structure with 257 symbols, the same principles are also applicable to other structures where a synchronisation symbol or synchronisation signal is followed by data symbols or signals.

Furthermore, in other embodiments not all synchronisation symbols may be sent, but only some synchronisation symbols, for example every second synchronisation symbol, every third synchronisation symbol, etc.

Another possibility for a low power mode will be explained with reference to FIG. 6.

Generally, in multitone communication systems like DMT systems where a plurality of carriers are used, so-called bit loading tables and gain tables are determined at start-up or initialization which indicates how many bits are loaded on each carrier and which gain is used for each carrier. As usual for carriers with higher frequencies a signal to noise ratio is lower, in most cases more bits can be loaded on carriers with lower frequencies than on carriers with higher frequencies. Generally, the bit loading and gain tables are determined for optimised data transmission rates taking, for example, noise margins or service considerations into account. For example, using a so-called "water filling" algorithm, a power density distribution for the carriers may be determined based on an overall desired maximum transmission power, a noise on the line, a line transfer function and a signal to noise ratio gap. In the embodiment of FIG. 6, at 60, additional low power tables, for example bit loading tables and gain tables, are determined, for example during initialisation. These tables may be determined in a similar manner than the conventional tables, for example using a water filling process, but with a lower overall maximum transmission power.

At 61, the low power tables are exchanged. For example, the tables may be calculated at the respective receiver, for example central office in upstream direction and customer premises in downstream direction, and then transmitted to the respective other side of the respective communication connections.

At 62, in a low power mode, the low power tables are used instead of the regular table.

Figure 6:
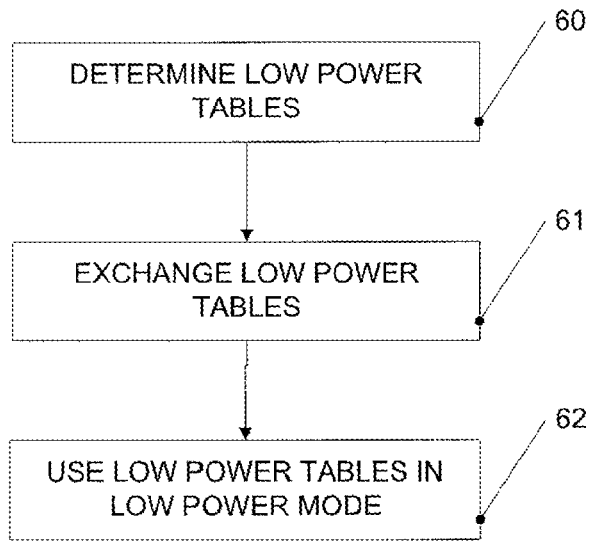
FIG. 6 shows a flow diagram illustrating a method according to an embodiment.

It should be noted that also in case of the low power mode of FIG. 6 the start and/or end of the low power mode may be signaled, e.g. requested or announced by modifying synchronisation symbols or by predefined data symbols following synchronisation symbols.

A further possibility for a low power mode will be explained with reference to FIG. 7.

In discrete multitone modulation systems as well as other multicarrier modulation systems like OFDM (orthogonal frequency division multiplexing), as already explained with reference to FIG. 6, a bit loading is determined, or, in other words, on a single carrier a plurality of bits are loaded. The bit value loaded on a carrier is reflected by a certain constellation point, which basically corresponds to a certain amplitude and phase of the signal of the respective carrier. For example, to load ten bits on a carrier, 1024 of such constellation points, e.g. 1024 different amplitude/phase combinations, are used. In an embodiment, in the low power mode the number of bits per carrier is reduced by m, and this reduction parameter m is communicated or exchanged at 70 in FIG. 7. At 71, when a low power mode is entered, the number of constellation points is reduced accordingly, e.g. by not using the 2m constellation points with the largest amplitudes. Therefore, the overall average amplitude and therefore the average power used for transmitting is reduced. In such an embodiment, reducing the number of bits per carrier by m bits will cause a power reduction by approximately 3×m dB.

While in some embodiments a single parameter m may be used for all carriers, in other embodiments different values for different carriers or different groups of carriers may be used and communicated.

A further possibility for a low power mode will be explained to FIG. 8. At 80, carrier numbers which are to be disregarded in a low power mode are communicated between the communication devices involved. At 81, in a low power mode the carriers designated by the carrier numbers communicated at 80 are omitted, i.e. not used for data transmission. In an embodiment, carriers having higher frequencies are omitted, while carriers having lower frequencies are used for data transmission. In such an embodiment, instead of communicating the carrier number at 80 only the overall number of carriers to be omitted may be communicated. In still other embodiments, this number may be predetermined and not communicated.

Figure 7:
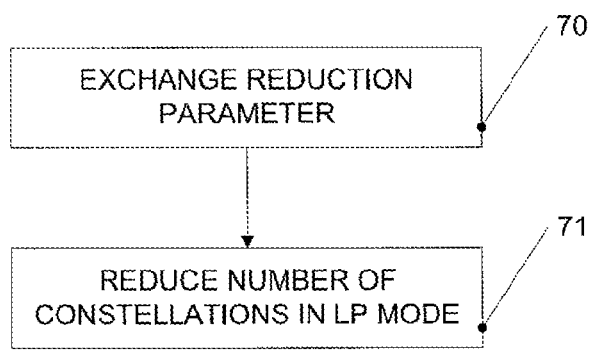
FIG. 7 shows a flow diagram illustrating a method according to an embodiment.
Figure 8:
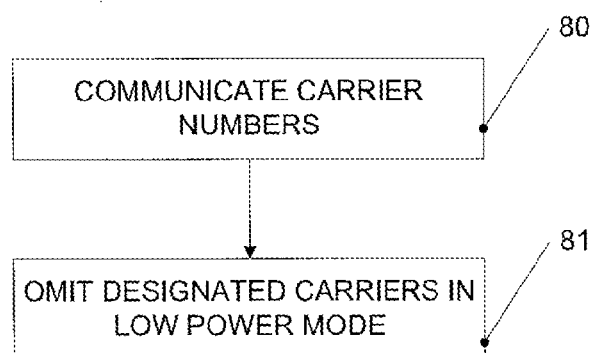
FIG. 8 shows a flow diagram illustrating a method according to an embodiment.

Also in the embodiment of FIGS. 7 and 8, the beginning and end of the low power mode may be communicated using marked synchronisation symbols or predetermined data symbols.

The low power modes discussed with reference to FIGS. 4 to 8 may be implemented in the communication systems and devices discussed with reference to FIGS. 1, 2 and 3, but may also be implemented in other communication devices using vectoring, i.e., crosstalk reduction through joint processing. As through the vectoring crosstalk between the individual communication connections is eliminated or reduced, in some embodiments an entering and leaving, e.g. a fast entering and leaving, of the low power mode may be performed for individual communication connections without significantly disturbing communication on other communication connections.

It should be noted that also several of the low power modes described above may be implemented in a single device, or the parameters of the low power modes like the number of data symbols in FIGS. 5A to 5C, the low power tables of FIG. 6, the reduction parameter of FIG. 7 or the carrier numbers of FIG. 8 may be varied depending on the amount of data to be transmitted in the low power mode. The switching between regular mode and low power mode or between regular mode and several low power modes may be performed automatically depending on the amount of data to be transferred and/or the bit rate needed therefor.

As can be seen from the above, a plurality of variations and alterations is possible, and therefore the scope of the application is not construed to be restricted to the embodiments described above.

What is claimed is:

1. A communication device, comprising:
    communication circuitry to communicate via a plurality of communication connections with a respective plurality of further communication devices,
    crosstalk reduction circuitry to compensate crosstalk on the plurality of communication connections by vectoring,
    wherein the communication for at least some of the communication connections comprises switching between a regular mode and a low power mode with less power consumption than in the regular mode, the switching being individually for each of the at least some of the communication connections, the individual switching of each of the at least some of the communication connections being based on a respective data threshold condition associated with each of the at least some of the communication connections, wherein the communication circuitry is configured to signal an entering of the low power mode by at least one of transmitting a marked synchronisation symbol, the marking to distinguish from regular synchronisation symbols, or transmitting a predetermined data symbol following a synchronisation symbol via the respective communication connection,
    wherein communication via the plurality of communication connections comprises modulation that uses a plurality of different constellations,
    wherein in the low power mode a number of constellations is reduced compared to the regular mode.

2. The communication device of claim 1, wherein communication via the plurality of communication connections comprises transmitting frames, each frame comprising a synchronisation symbol followed by data symbols, wherein in the low power mode at least one of the data symbols is set to zero nominal transmit power.

3. The communication device of claim 1, wherein communication via the plurality of communication connections is a multicarrier communication.

4. The communication device of claim 3, wherein the low power mode employs a different bit loading table describing bit loading for the carriers of the multicarrier communication and/or a different gain table defining gains for the plurality of carriers than in the regular mode.

5. The communication device of claim 3, wherein in the low power mode only some carriers of the multicarrier communication are used.

6. The communication device of claim 1, wherein the communication device is configured to perform DSL communication via the plurality of communication connections.

7. A method, comprising:
    transmitting data via a plurality of communication connections to communicate with a respective plurality of communication devices,
    reducing crosstalk by joint processing of data transmitted via the plurality of communication connections, and
    individually switching between a regular mode and a low power mode for at least some of the communication connections based on a respective data threshold condition associated with each of the at least some of the communication connections, and
    signaling the switching by at least one of transmitting a marked synchronisation symbol, the marking to distinguish from regular synchronisation symbols, or transmitting a predetermined data symbol following a synchronisation symbol via a respective communication connection,
    wherein transmitting data via the plurality of communication connections comprises a modulation using a plurality of different constellations,
    wherein in the low power mode a number of constellations is reduced compared to the regular mode.

8. The method of claim 7, wherein the switching is performed depending on an amount of data to be transferred via a respective communication connection.

9. The method of claim 7, wherein the data transmission via the plurality of communication connections is a multicarrier transmission.

10. The method of claim 9, wherein switching to low power mode comprises omitting some of the plurality of carriers on a communication connection switched to low power mode.

11. The method of claim 9, wherein the low power mode comprises using a different bit loading table describing bit loading for the carriers of the multicarrier communication and/or a different gain table defining gains for the plurality of carriers than in the regular mode.

12. The method of claim 7, wherein transmitting data via the plurality of communication connections comprises transmitting frames, each frame comprising a synchronisation symbol followed by data symbols, wherein in the low power mode at least one of the data symbols is set to zero nominal transmit power.

* * * * *